United States Patent [19]
Jun et al.

[11] Patent Number: 6,040,882
[45] Date of Patent: Mar. 21, 2000

[54] LIQUID CRYSTAL DISPLAY DEVICE HAVING "H" CHARACTER COMMON ELECTRODE AND METHOD OF FABRICATING THEREOF

[75] Inventors: Jung-Mok Jun, Seoul; Seok-Lyul Lee, Kyoungki-do, both of Rep. of Korea

[73] Assignee: Hyundai Electronics Industries Co., Ltd., Kyoungki-do, Rep. of Korea

[21] Appl. No.: 08/951,410

[22] Filed: Oct. 16, 1997

[30] Foreign Application Priority Data

Oct. 16, 1996 [KR] Rep. of Korea ...................... 96-46299

[51] Int. Cl.[7] ................................................ G02F 1/1343
[52] U.S. Cl. .............................. 349/39; 349/143; 349/111
[58] Field of Search .................................. 349/38, 39, 40, 349/41, 42, 111, 54, 55, 143, 144

[56] References Cited

U.S. PATENT DOCUMENTS

| | | | |
|---|---|---|---|
| 5,159,476 | 10/1992 | Hayashi | 349/39 |
| 5,337,173 | 8/1994 | Atsumi et al. | 349/39 |
| 5,517,341 | 5/1996 | Kim et al. | |
| 5,517,342 | 5/1996 | Kim et al. | |
| 5,528,395 | 6/1996 | So | |
| 5,808,706 | 9/1998 | Bae | 349/38 |
| 5,844,641 | 12/1998 | Jun et al. | 349/38 |
| 5,844,647 | 12/1998 | Maruno | 349/110 |
| 5,886,756 | 3/1999 | Lee | 349/39 |

FOREIGN PATENT DOCUMENTS 3-100626 4/1991 Japan .......................... 349/FOR 111

*Primary Examiner*—William L. Sikes
*Attorney, Agent, or Firm*—Ware, Fressola, Van Der Sluys & Adolphson LLP

[57] ABSTRACT

Pairs of liquid crystal display pixel electrodes are fabricated to commonly share a capacitor electrode in the shape of an "H" character which overlaps along periphery portions of the corresponding two pixel electrodes, except for periphery portions thereof respectively connected to corresponding switching devices.

13 Claims, 3 Drawing Sheets

LIQUID CRYSTAL DISPLAY DEVICE HAVING "H" CHARACTER COMMON ELECTRODE AND METHOD OF FABRICATING THEREOF

BACKGROUND OF THE INVENTION

1. Field of the Invention

This invention relates to a liquid crystal display device and more particularly to an active liquid crystal display device capable of enhancing an aperture ratio and an image quality of the liquid crystal display device and a method of fabricating thereof.

2. Description of the Related Art

In response to a demand for personalized, space-saving displays which serve as the interface between humans and computers, various types of flat screen or flat panel displays, such as a liquid crystal display (LCD), a plasma display panel (PDP), and an electroluminescent (EL) display, etc., have been developed to replace conventional display devices, particularly a cathode-ray tube (CRT) which is relatively large and obtrusive.

Liquid crystal displays can have a simple matrix form or an active matrix form, using an electro-optic property of the liquid crystal whose molecular arrangement is varied according to an electric field. In particular, the LCD in the active matrix form utilizes a combination of liquid crystal technology and semiconductor technology, and is recognized as being superior to CRT displays.

The active matrix LCDs utilize an active device having a non-linear characteristic in each of a plurality of pixels arranged in a matrix configuration, using the switching characteristic of the device thereby to control each pixel.

A thin film transistor(hereinafter referred as a "TFT") having three electrode terminals is ordinarily used as the active device, or a thin film diode (TFD), for example, a metal insulator metal type (NIM) having two terminals, is used.

To obtain uniformity of an image displayed on the active matrix LCD, it is necessary that the voltage of a signal applied through a display signal line in a writing operation is held constant for a certain time until a second signal is received. In order to obtain this effect, a storage capacitor is formed at each pixel. Also, in order to improve the image quality of the display, a storage capacitor is formed in parallel with a liquid crystal cell.

Here, the storage capacitor is separately formed in an independent wiring form from a conventional scanning signal line. A capacitor electrode for forming the storage capacitor in an independent wiring form is formed simultaneously with the scanning signal line.

FIG. 1 shows a pixel layout of a conventional active matrix liquid crystal display on which storage capacitors in the independent wiring form is formed.

As shown in FIG. 1, scanning signal lines 2 and display signal lines 5 are arranged in a matrix form on a lower glass substrate 1. Pixels are formed at regions bounded by these two types of lines and at each pixel is arranged a pixel electrode 4 which is of a transparent material such as an indium tin oxide.

In addition, semiconductor layers 3 which serve as the channels of TFTs are formed on scanning signal lines 2. Each of Semiconductor layer 3 is connected to display signal line 5 via a drain electrode 6 and also connected to a pixel electrode 4 via a source electrode 7. Accordingly, driving of each pixel which is arranged in a matrix form is independently controlled by TFT which serves as a switching device.

Also, an independently wired capacitor electrode 10 separated from each scanning signal line 2 with a selected distance and parallel with it, is formed at each pixel. The capacitor electrode 10 is formed of opaque conductive metal such as aluminum chromium, tantalum or molybdenum.

However, as the active matrix LCD having an independent wired storage capacitor described above has capacitor electrodes of opaque metal within each pixel, the aperture ratio decreases.

Moreover, as current LCD must be designed such that spaces between pixel electrode and display signal line, between the display signal line and an adjacent display signal line thereto, and the scanning signal line and an adjacent scanning signal line thereto are minimized so as to improve the aperture ratio thereof, there occurs a parasitic capacitance between pixel electrode and the display signal lines and between pixel electrode and the scanning signal lines due to a voltage variation of signals applied to the scanning signal line and the display signal line and thereby there occur illuminance spots and crosstalks.

In addition, in order to realize the coloration of the active matrix LCD, at the step of combining a lower substrate having the structure as described above with an upper substrate having color filter layers, it is very difficult to accurately align the color filter layers with pixel electrodes, respectively. Accordingly, when each of the pixel electrodes is not precisely aligned with the corresponding one of the color filter layers, the light leakage occurs. Furthermore, if black matrices for separating the color filters on the upper substrate from each other are widened to prevent such light leakage, the aperture ratio of the LCD is lowered.

SUMMARY OF THE INVENTION

It is therefore an object of this invention to provide a liquid crystal display device and a method of fabricating the liquid crystal display device, capable of improving an aperture ratio.

It is a further object of this invention to provide a liquid crystal display device and a method of fabricating the liquid crystal display device, capable of preventing a light leakage by forming a light shielding layer on a region between a display signal line and a pixel electrode.

It is still further object of this invention to provide a liquid crystal display device and a method of fabricating the liquid crystal display device, capable of preventing the parasitic capacitance between the display signal line and the pixel electrode, thereby eliminating illuminance spots and crosstalks of the LCD due to parasitic capacitance, by designing the space between the pixel electrode and the display signal line more wide than that of prior art.

In a LCD display of this invention, a number of scanning signal lines and a number of display signal lines which intersect the scanning signal lines, are arranged on a surface of a transparent substrate. The scanning signal lines each consists of a pair of sub scanning signal lines. The scanning signal lines are arranged such that a number of pairs of sub scanning signal lines are repeated with a relatively wide distance therebetween. The one pair of sub scanning signal lines are separated from the another pair of sub scanning signal lines with the relatively long distance therebetween. One of the pair of sub scanning signal lines is arranged adjacently to the other of the pair of sub scanning signals with a relatively short distance therebetween. The pair of sub scanning signal lines and the pair of display signal lines define a first region, i.e., a narrow region. The lower one of the pair of sub scanning signal lines and the upper one of the next pair of sub scanning signal lines, and the display signal lines define a second region, i.e., a wide region which is more wide than the first region.

A plurality of pixel electrodes are formed within the second regions such that two pixel electrodes are disposed within each second region. Each pixel electrode is formed of a transparent conductive material such as indium tin oxide.

A plurality of switching devices respectively are formed on the scanning signal lines for applying a electrical signal to the pixel electrodes. In the meantime, one inversely staggered TFT using one of a pair of sub scanning signal lines as gate electrodes is formed on the one of pair of sub scanning signal lines as a switching device, for applying an electrical signal to the pixel electrode in one second region via display signal line. Also in the same manner, another inversely staggered TFT using the other of a pair of sub scanning signal lines as switching devices for applying an electrical signal to the pixel electrode in another second region adjacent to the one second region via display signal line. Here, a portion protruded from display signal line in the first region serves as common drain electrode of the two TFTs.

A common electrode in the form of "H" character is disposed within the wide region and corresponds in common to a pair of pixel electrodes. The common electrode is arranged such that it overlaps along periphery portions of the sides of the two pixel electrodes except for periphery portions of sides thereof which are connected with the TFTs, respective for forming a storage capacitance type capacitor therebetween. Two opposingly outmost side portions of the common electrode extend at least to the display signal lines in order to eliminate a light leakage.

The common electrode is connected to adjacent common electrodes both rightwards and leftwards in parallel with the scanning signal lines via connecting portions. The common electrode is driven independently from the scanning signal line and the display signal line.

According to this invention, as the common electrode is formed such that it shares two adjacent pixel electrodes within the wide region, the aperture ratio increases.

Moreover, as the common electrode of an opaque metal is in "H" character type and the two side portions thereof which do not overlap pixel electrodes extend to the display signal line, and serve as a light shielding layer between the display signal line and the pixel electrode, a light leakage of the LCD eliminates and there is also no need to extend a black matrix in an upper substrate to a portion corresponding to the periphery of the pixel electrode in the lower substrate so as to eliminate a light leakage.

Furthermore, according to this invention, as each of the common electrodes shares two pixel electrodes within each pixel area, thereby to increase the aperture ratio of the LCD, a greater distance between a pixel electrode and a display signal line than that of the prior art LCD may be obtained. Accordingly, the parasitic capacitance between the pixel electrode and the display signal line is extremely decreased and thereby badness according to the illuminance spots and crosstalks, etc. which occur at the time of driving of the LCD due to a voltage variation of the signal applied to the display signal line can be prevented.

BRIEF DESCRIPTION OF THE DRAWINGS

The above mentioned and other features and objects of this invention will become more apparent and the invention itself will be best understand by reference of the following description of embodiment of the invention taken in conjunction with the accompanying drawings wherein.

DESCRIPTION OF A PREFERRED EMBODIMENT

Figure 1:
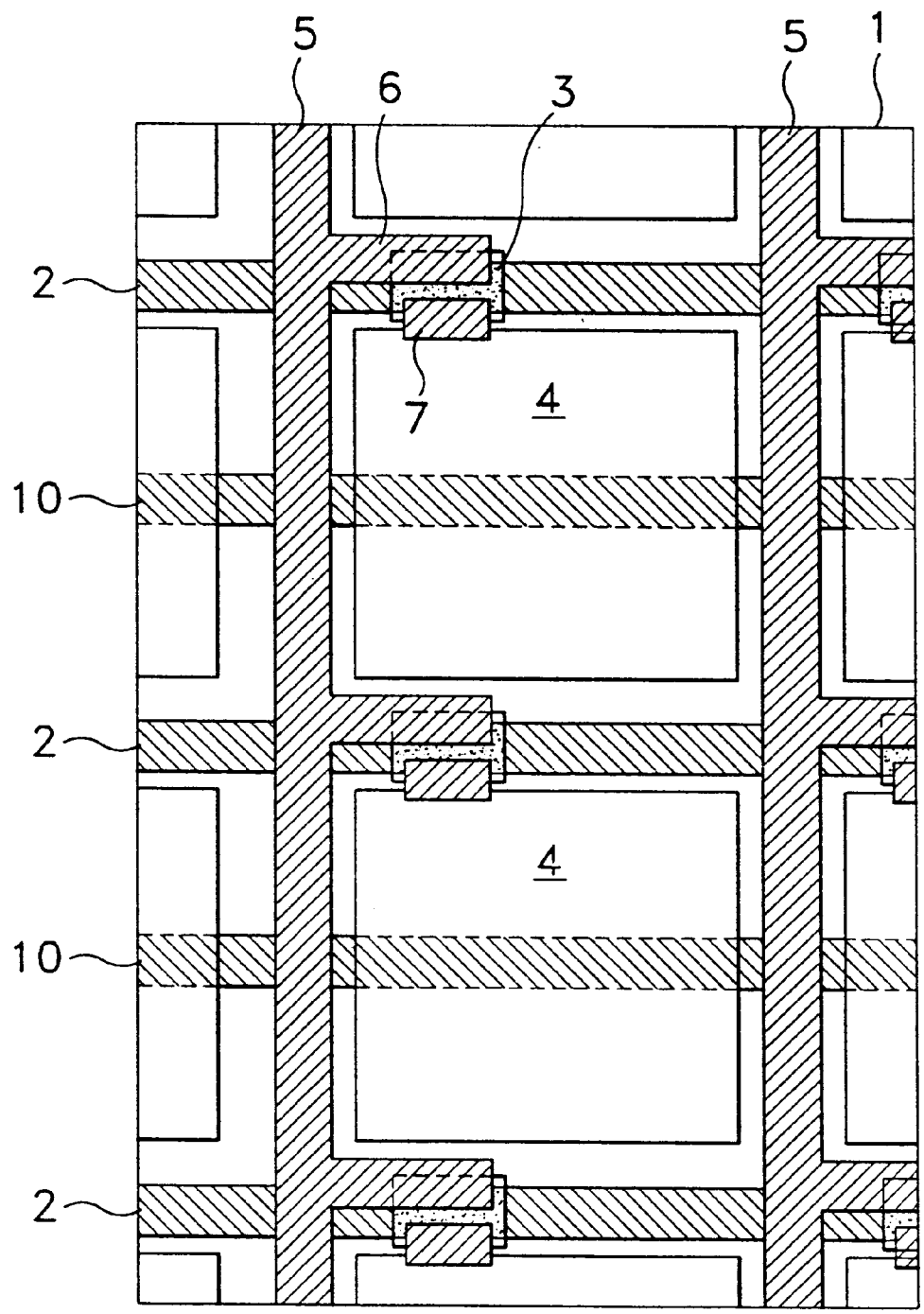
FIG. 1 shows a pixel layout of a typical prior art active matrix liquid crystal display.
Figure 2:
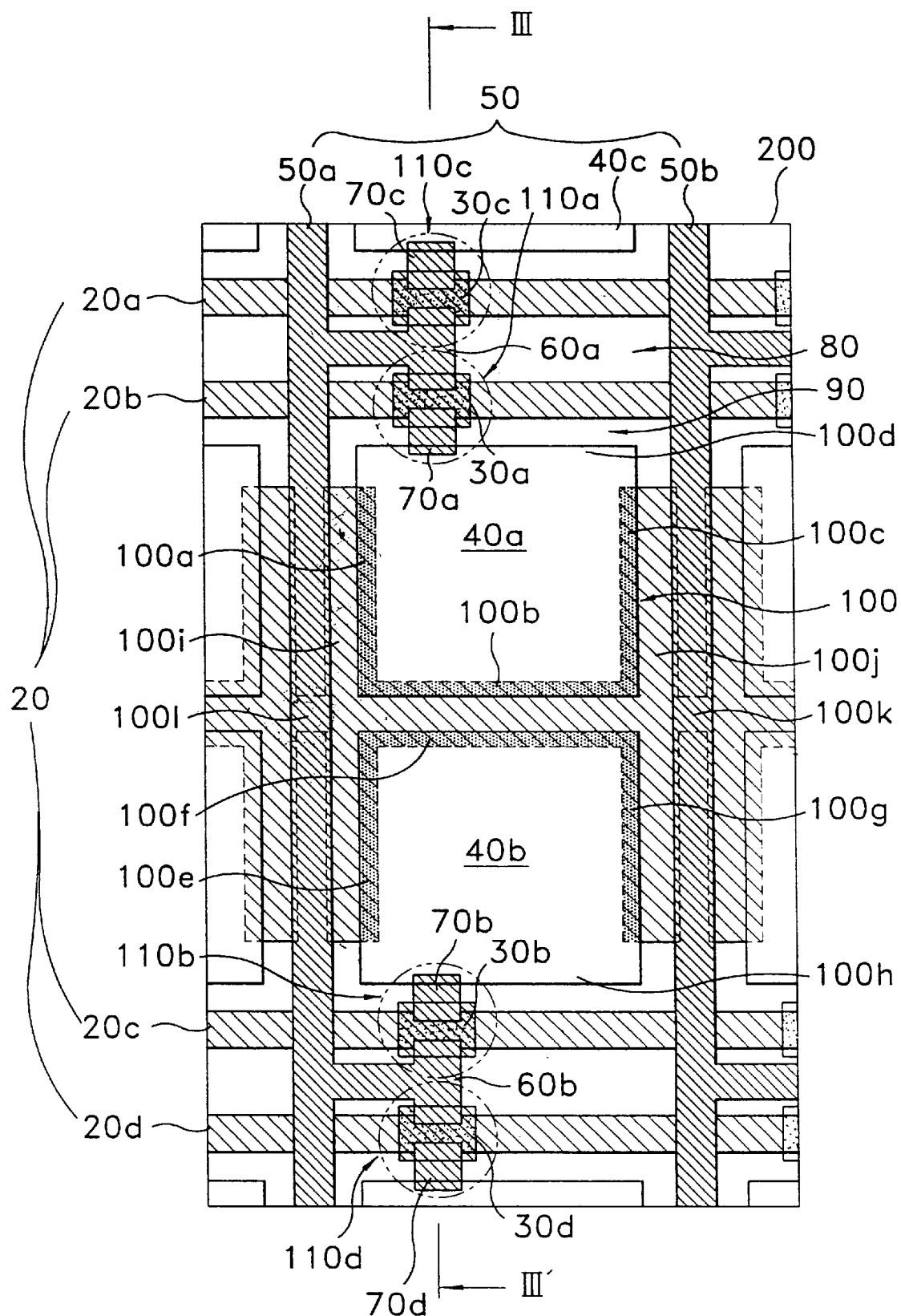
FIG. 2 shows a pixel layout of an active matrix liquid crystal display of the present invention.

Hereinafter, this invention will be explained in detail with reference to the accompanying drawings:

Referring now to FIG. 2, a number of scanning signal lines 20 and a number of display signal lines 50 which intersect the scanning signal lines, are arranged on a surface of a transparent substrate 200. The scanning signal lines 20 each consists of a pair of sub scanning signal lines. The scanning signal lines are arranged such that a number of pairs of sub scanning signal lines are repeated with a relatively long distance therebetween. For example, a first sub scanning signal line 20a and a second sub scanning signal line 20b are consisted of one scanning signal line. A third sub scanning signal line 20c and a fourth sub scanning signal line 20d are consisted of another scanning signal line. The one pair of sub scanning signal lines 20a and 20b are separated from the another pair of sub scanning signal lines 20c and 20d with the relatively long distance therebetween. One of the pair of scanning signal lines 20a (or 20c) is arranged adjacently to the other 20b (or 20d) with a relatively short distance therebetween. The pair of sub scanning signal lines 20a and 20b and the pair of display signal lines 50a and 50b define a first region 80, i.e., a relatively narrow region. One of the pair of sub scanning signal lines 20b and one of the next pair of sub scanning signal lines 20c, and the display signal lines 50a and 50b define a second region 90, i.e., a relatively wide region.

A plurality of pixel electrodes are formed within the second regions such that two pixel electrodes are disposed within each second region. For example, two pixel electrodes 40a and 40b are arranged with a selected distance within the second region 90 in parallel with the display signal lines 50. Each pixel electrode is formed of a transparent conductive material such as indium tin oxide.

A plurality of switching devices respectively are formed on the scanning signal lines for applying a electrical signal to the pixel electrodes. As shown in FIG. 2, two thin film transistors 110a and 110b as switching devices correspond to the second region 90 so as to connect the display signal line 50a to two pixel electrodes 40a and 40b, respectively. In the meantime, one inversely staggered TFT using the sub scanning signal line 20b as a gate electrode is formed on the sub scanning signal line 20b as a switching device for applying an electrical signal to the pixel electrode 40a via display signal line 50a. Also in the same manner, another inversely staggered TFT using the sub scanning signal line 20a as a gate electrode is formed on the sub scanning signal line 20a as a switching device for applying an electrical signal to the pixel electrode 40c via display signal line 50a. Instead of the inversely staggered TFT, thin film diode (TFD), for example, a metal insulator metal (MIM) diode having two terminals, may be used. Here, a portion 60a protruded from display signal line 50a serves as common drain electrode of the two TFTs 110a and 110c. The common drain electrode corresponds to the pixel electrode 40a and a pixel electrode 40c disposed in the wide region which lies above the narrow region 80. In the same manner, another protruded portion 60b from display signal line 50a also forms common drain electrode of the TFTs 110b and 110d.

The common electrode 100 in the form of "H" character is disposed within the wide region 90 and corresponds in common to the pair of pixel electrodes 40a and 40b.

As shown in FIG. 2, the common electrode 100 is arranged such that it overlaps along the periphery portions 100a, 100b, 100c, 100e, 100f, and 100g of two pixel electrodes 40a and 40b except for periphery portions 100d and 100h thereof which are connected with the TFTs 110a and 110b, for forming a storage capacitance type capacitor therebetween. Two side portions 100i and 100j of the common electrode 100 extend at least to the display signal lines 50a and 50b in order to prevent a light leakage.

As shown in FIG. 2, the "H" character type common electrode 100 is connected to adjacent "H" character type common electrodes both rightwards and leftwards in parallel with the scanning signal lines via connecting portions 100k and 100l. The "H" character-type common electrode 100 is driven independently from the scanning signal line 20 and the display signal line 50.

Hereinafter, one embodiment of a method for manufacturing a liquid crystal display according to this invention will be explained with the reference to FIGS. 2 and 3.

Figure 3:
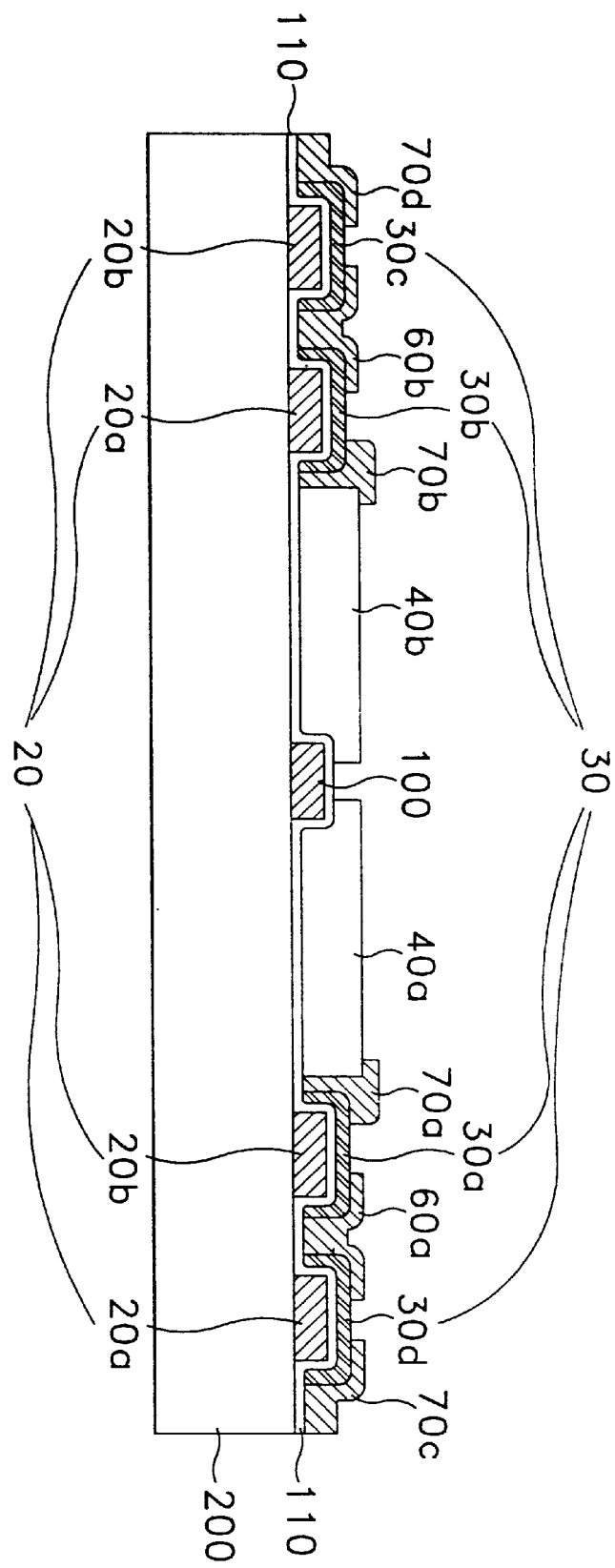
FIG. 3 is a cross-sectional view taken along line III-III' for explaining a method of fabricating the active matrix crystal display according to this invention.

As shown in FIG. 3, at first, a first metal layer is deposited to a thickness of not more than 4000 Å on a transparent substrate 200. The first metal layer is patterned to simultaneously form scanning signal lines 20 and common electrodes 100. Connecting portions 100k and 100l are also formed so as to be connected between the two adjacent common electrodes.

Here, as shown in FIG. 2, the scanning signal lines each 20 consists of a pair of sub scanning signal lines. The scanning signal lines are arranged such that a number of pairs of sub scanning signal lines are repeated with a relatively long distance therebetween. One of the pair of the sub scanning signal lines is arranged adjacently to the other thereof with a relatively short distance therebetween. Each of the common electrodes has "H" character type. Each of the "H" character type common electrodes 100 is connected to adjacent "H" character type common electrodes both rightwards and leftwards in parallel with the sub scanning signal lines via connecting portions 100k and 100l. Since the common electrodes 100 also serve as light shielding layers, the first metal layer should be comprised of an opaque metal such as chromium, tantalum, aluminum, molytantalum, or molytungsten, etc.

Then, using a chemical vapor deposition method, an insulating layer 110 is formed on the resultant structure to the selected thickness and a semiconductor layer 30 of amorphous silicon which serves as a channel of TFT is then formed on a surface of the insulating layer 110, so as to define an area in which the switching devices will be formed on scanning signal lines 20.

Successively, a transparent conductive metal such as indium tin oxide is deposited on the resultant structure and is then patterned to form two pixel electrodes 40a and 40b within each second region 90. As shown in FIG. 2, two pixel electrodes 40a and 40b correspond to the common electrode 100 and the periphery portions 100a, 100b, 100c, 100e, 100f, and 100g of the two pixel electrodes 40a and 40b overlap the common electrode 100.

Thereafter, an opaque conductive metal is deposited on the resultant structure and is patterned to simultaneously form display signal lines (not shown in FIG. 3) which intersect the scanning signal lines 20, the drain electrodes 60a and 60b and source electrodes 70a, 70b, 70c, and 70d. Here, as shown in FIG. 2, each of protruded portions 60a and 60b from display signal line 50a corresponds in common to two TFTs 110a and 110c, or 110b and 110d which are formed on the pair of sub scanning signal lines 20a and 20b, or 20c and 20d, respectively.

According to this invention, as each of the common electrodes is formed such that it shares two adjacent pixel electrodes within the wide region, the aperture ratio of the LCD increases.

Moreover, as the common electrode of an opaque metal is in "H" character type and each of the two side portions thereof which do not overlap pixel electrodes extends to the display signal line, thereby to serve as a light shielding layer between the display signal line and the pixel electrode, a light leakage of the LCD eliminates and there is also no need to extend a black matrix in an upper substrate to a portion corresponding to the periphery of the pixel electrode in the lower substrate so as to prevent a light leakage.

Furthermore, according to this invention, as each of the common electrodes shares two pixel electrodes within each pixel area, thereby to increase the aperture ratio of the LCD, a greater distance between a pixel electrode and a display signal line than that of the prior art LCD may be obtained. Accordingly, the parasitic capacitance between the pixel electrode and the display signal line is suppressed and therefore the badness of a image quality according to illuminance spots and crosstalks etc. which occur at the time of driving of the LCD due to a voltage variation of the signal applied to the display signal line can be prevented.

While this invention has been particularly shown and described with reference to particular embodiment thereof, it will be understood by those skilled in the art that various changes in form and details may be effected therein without departing from the spirit and scope of the invention as defined by the appended claims.

What is claimed is:

1. A liquid crystal display device comprising:

a transparent substrate;

a plurality of scanning signal lines arranged on a surface of said transparent substrate, the scanning signal lines each having a pair of sub scanning signal lines, the scanning signal lines being arranged such that a number of pairs of sub scanning signal lines are repeated with a first distance, one of each pair of sub scanning signal lines being arranged adjacent to the other of each pair of sub scanning signal lines with a second distance being shorter than said first distance;

a plurality of display signal lines which intersect said plurality of scanning signal lines, being arranged on said surface of the transparent substrate, the pair of sub scanning signal lines and a pair of display signal lines defining a first region, an upper one of the pair of sub scanning signal lines and a lower one of a next pair of sub scanning signal lines and the pair of display signal lines, defining a second region which is wider than said first region;

a plurality of pixel electrodes being arranged within the second regions, the two pixel electrodes disposed within of the second regions;

a plurality of switching devices respectively corresponding to the second regions, each of the switching devices being connected to a corresponding one of the display signal lines and a corresponding one of the pixel electrodes; and a plurality of common electrodes respectively disposed within the corresponding one of the second regions such that each common electrode is shared by the two pixel electrodes in each second region so as to face the corresponding two pixel electrodes in the corresponding second region, the common electrodes being driven independently from the plurality of scanning signal lines and the plurality of display signal lines wherein each common electrode is in the form of an H character, and the common electrode overlaps along periphery portions of the corresponding two pixel electrodes except for periphery portions thereof respectively connected to the corresponding switching device, for forming a storage capacitance type capacitor therebetween.

2. The liquid crystal display device as claimed in claim 1, further comprising a plurality of connecting portions for connecting one common electrode in one second region to another common electrode in adjacent second region.

3. The liquid crystal display device as claimed in claim 1, wherein two opposingly outmost sides of said common electrode extend at least to the display signal lines.

4. The liquid crystal display device as claimed in claim 1, wherein the two switching devices are formed on said pair of sub scanning signal lines and the two switching devices have one common protruded portion from the corresponding display signal line, serving as drain electrodes thereof.

5. The liquid crystal display device as claimed in claim 1, wherein the common electrodes and the scanning signal lines are comprised of same material.

6. The liquid crystal display device as claimed in claim 5, wherein the material is comprised of at least one opaque conductive metal selected from a group consisting of aluminum, chromium, molytantalum, and molybdenum.

7. A method for manufacturing a liquid crystal display as claimed in claim 1, the method comprising the steps of:

forming a first metal layer on the transparent substrate;

patterning the first metal layer to form the scanning signal lines and the common electrodes within the second regions, wherein each common electrode is in the form of said H character, and the common electrode overlaps along periphery portions of the corresponding two pixel electrodes except for periphery portions thereof respectively connected to the corresponding switching device, for forming a storage capacitance type capacitor therebetween;

successively forming an insulating layer and a semiconductor layer on the surface of the resulting structure;

patterning the semiconductor layer to leave the semiconductor layer only around a portion of the scanning signal lines;

forming a transparent conductive layer on the surface of the resulting structure;

patterning the transparent conductive layer to form the pixel electrodes;

forming a second metal layer on the resulting structure; and patterning the second metal layer to simultaneously form the plurality of display signal lines, and source/drain electrodes of the switching devices on the semiconductor layer.

8. The method for manufacturing a liquid crystal display as claimed in claim 7, further comprising the step of forming a connecting portion for connecting said one common electrode in said one second region to another common electrode in another second region adjacent to said one second region at the same time of forming the scanning signal lines and said common electrode.

9. The method for manufacturing a liquid crystal display as claimed in claim 7, wherein two opposingly outmost sides of said common electrode extend at least to the display signal lines.

10. The method for manufacturing a liquid crystal display as claimed in claim 7, wherein the two switching devices are formed on said pair of sub scanning signal lines and the two switching devices have one common electrode protruded portion from the corresponding display signal line, serving as drain electrodes thereof.

11. The method for manufacturing a liquid crystal display as claimed in claim 7, wherein said common electrode and said scanning signal lines are of same material.

12. The method for manufacturing a liquid crystal display as claimed in claim 11, wherein the first metal layer is comprised of at least one opaque conductive metal selected from a group consisting of aluminum, chromium, molytantalum, and molybdenum.

13. Liquid crystal display device having a plurality of pixel electrodes on a substrate, each pixel electrode bounded by display signal lines and scanning signal lines, each pixel electrode having a capacitor electrode as well as a switching device associated therewith, characterized in that pairs of said pixel electrodes are arranged to commonly share a capacitor electrode in the shape of an H character which overlaps along sides of a corresponding pair of pixel electrodes except for sides thereof respectively connected to corresponding switching devices.

* * * * *

UNITED STATES PATENT AND TRADEMARK OFFICE
CERTIFICATE OF CORRECTION

PATENT NO. : 6,040,882
DATED : March 21, 2000
INVENTOR(S) : Jun et al

It is certified that error appears in the above-indentified patent and that said Letters Patent is hereby corrected as shown below:

Item [54], line 1, please cancel "DEVICE".

At col. 1, line 1, please cancel "DEVICE".

At col. 3, lines 28-29, please cancel "TFTs, respective" and substitute --respective TFTs--.

At col. 6, line 60 (claim 1, line 23), after "within", please insert --each--.

Signed and Sealed this

Tenth Day of April, 2001

NICHOLAS P. GODICI

Attest:

Attesting Officer

Acting Director of the United States Patent and Trademark Office